United States Patent
Yoshida et al.

(10) Patent No.: US 8,400,709 B2
(45) Date of Patent: Mar. 19, 2013

(54) LASER SCAN CONFOCAL MICROSCOPE

(75) Inventors: Yuki Yoshida, Yokohama (JP); Naoshi Aikawa, Fujisawa (JP)

(73) Assignee: Nikon, Corporation, Tokyo (JP)

( * ) Notice: Subject to any disclaimer, the term of this patent is extended or adjusted under 35 U.S.C. 154(b) by 0 days.

(21) Appl. No.: 12/929,506

(22) Filed: Jan. 28, 2011

(65) Prior Publication Data

US 2011/0141557 A1 Jun. 16, 2011

Related U.S. Application Data

(60) Division of application No. 12/453,825, filed on May 22, 2009, now Pat. No. 7,903,329, which is a continuation of application No. PCT/JP2007/074511, filed on Dec. 20, 2007.

(30) Foreign Application Priority Data

Dec. 22, 2006 (JP) .................................. 2006-345662

(51) Int. Cl.
G02B 21/00 (2006.01)

(52) U.S. Cl. ........................................ 359/368; 359/385

(58) Field of Classification Search ........... 359/368–390
See application file for complete search history.

(56) References Cited

U.S. PATENT DOCUMENTS

| | | | |
|---|---|---|---|
| 5,323,009 A | 6/1994 | Harris | |
| 6,108,127 A | 8/2000 | Atkinson | |
| 6,167,173 A * | 12/2000 | Schoeppe et al. | 385/33 |
| 6,204,955 B1 | 3/2001 | Chao et al. | |
| 6,909,542 B2 * | 6/2005 | Sasaki | 359/385 |
| 2004/0032650 A1 | 2/2004 | Lauer | |
| 2004/0178356 A1 | 9/2004 | Natori | |
| 2005/0018282 A1 | 1/2005 | Riedmann | |
| 2006/0012871 A1 | 1/2006 | Funk et al. | |
| 2006/0291039 A1 * | 12/2006 | Eda et al. | 359/362 |
| 2007/0007428 A1 * | 1/2007 | Ri | 250/201.3 |
| 2009/0303583 A1 | 12/2009 | Klose et al. | |

FOREIGN PATENT DOCUMENTS

| | | |
|---|---|---|
| DE | 103 33 445 A1 | 2/2005 |
| DE | 10 2004 011 770 A1 | 10/2005 |
| DE | 10 2005 020 542 A1 | 11/2006 |
| EP | 1 617 206 A1 | 10/2004 |
| JP | A-04-175713 | 6/1992 |
| JP | B2-3365884 | 1/2003 |
| JP | A-2005-043892 | 2/2005 |
| JP | 2005-189290 | * 7/2005 |

(Continued)

OTHER PUBLICATIONS

Extended European Search Report issued in EP Application No. 07850946.0 on May 10, 2011.

(Continued)

Primary Examiner — Thong Nguyen
(74) Attorney, Agent, or Firm — Oliff & Berridge, PLC (57) ABSTRACT

Fluorescence is generated from an irradiated point on an inspection surface of a sample and the fluorescence is collected by an objective lens. Here, because of the magnification chromatic aberration of the objective lens, the fluorescence going out from the objective lens travels along a path shifted from the irradiation light and changed substantially into a non-scan light by a galvano-scanner. The fluorescence passes through a dichroic mirror and comes into deflection system after light of unnecessary wavelength is removed by a filter. The deflection system is driven in synchronization with the galvano-scanner by a computer and corrects the shift and inclination of the optical axis generated by the magnification chromatic aberration of the objective lens. Then the fluorescence forms an image of the irradiation point of the inspection surface of the sample on a pin hole of a pin hole plate by using a collective lens.

9 Claims, 6 Drawing Sheets

FOREIGN PATENT DOCUMENTS

JP      A-2005-275199      10/2005
WO     WO 98/52084      11/1998

OTHER PUBLICATIONS

International Search Report in International Application No. PCT/JP2007/074511, mailed Apr. 8, 2008.

Feb. 24, 2012 Search Report issued in European Patent Application No. 11190303.5.

Feb. 24, 2012 Search Report issued in European Patent Application No. 11190282.1.

Feb. 24, 2012 Search Report issued in European Patent Application No. 11190299.5.

Human Partial English Translation of Japanese Patent Publication No. JP2005-189290A submitted on the PTO-1449 filed Oct. 19, 2012.

\* cited by examiner

| OBJECTIVE LENS | 10x | | | | | |
|---|---|---|---|---|---|---|
| ILLUMINATION WAVELENGTH | 405nm | | | | | |
| | 405nm | 410nm | 415nm | ≀ | 745nm | 750nm |
| 0 DEGREE | K11 | K21 | K31 | ≀ | K41 | K51 |
| 1 DEGREE | K12 | K22 | K32 | ≀ | K42 | K52 |
| 2 DEGREES | K13 | K23 | K33 | ≀ | K43 | K53 |
| 3 DEGREES | K14 | K24 | K34 | ≀ | K44 | K54 |

FIG.7

| OBJECTIVE LENS | 10x | | | | | |
|---|---|---|---|---|---|---|
| | 400nm | 410nm | 420nm | ≀ | 740nm | 750nm |
| 0 DEGREE | S11 | S21 | S31 | ≀ | S41 | S51 |
| 1 DEGREE | S12 | S22 | S32 | ≀ | S42 | S52 |
| 2 DEGREES | S13 | S23 | S33 | ≀ | S43 | S53 |
| 3 DEGREES | S14 | S24 | S34 | ≀ | S44 | S54 |

FIG.8

| OBJECTIVE LENS | 10x | | | | | |
|---|---|---|---|---|---|---|
| | 400nm | 410nm | 420nm | ≀ | 740nm | 750nm |
| | A1 | A2 | A3 | ≀ | A4 | A5 |

LASER SCAN CONFOCAL MICROSCOPE

This is a Division of application Ser. No. 12/453,825 filed May 22, 2009, which in turn is a continuation of PCT/JP2007/074511, filed Dec. 20, 2007, which claims the benefit of Japanese Application No. 2006-345662 filed Dec. 22, 2006. The disclosure of the prior applications is hereby incorporated by reference herein in its entirety.

BACKGROUND

The present invention relates to a laser scan confocal microscope.

For example, in a confocal microscope disclosed in Japanese Patent No. 3365884 (Patent Document 1), illumination light is collected onto a sample such as a living sample, a light flux (fluorescent light) emitted from a focal portion on the sample is collected onto a confocal diaphragm plane, and a light quantity of the light flux having passed through the confocal diaphragm is detected by a photodetector. In order to obtain a two-dimensional image of the sample, the illumination light is converted into scan light by a galvano-mirror type scanner or the like, and the two-dimensional image of the sample is obtained while the sample is scanned with a focal portion (spot).

A pinhole member is disposed in the confocal diaphragm plane. Because the pinhole member transmits only a light beam collected in a pinhole (aperture) while cutting off other light beams, only the light beam emitted from a particular depth on the sample is incident to the photodetector, and the light beams emitted from other depths are not incident to the photodetector. Therefore, in the confocal microscope, an observation object can be sectioned only to an image of a thin-film layer located at the particular depth on the sample. In order to change sectioning resolution (thickness of a layer to be observed), it is necessary to change an aperture diameter of the pinhole member. The sectioning resolution is lowered when the aperture diameter is increased, and the sectioning resolution is enhanced when the aperture diameter is decreased.

Because the sectioning resolution depends on an aperture diameter of the pinhole, it is convenient that the aperture diameter of the pinhole is changed. Therefore, a method in which an aperture diameter of the pinhole can be changed like an iris diaphragm of a camera, a method in which plural pinholes having different aperture diameters are prepared such that one of the pinholes can be selected in a turret manner or a sliding manner, and a method in which plural pinholes are prepared such that an optical path can be changed, are used.
Patent Document 1: Japanese Patent No. 3365884
Patent Document 2: Japanese Patent Application Laid-Open No. 2005-275199

However, when an aperture diameter of the pinhole is decreased to enhance the sectioning resolution, there is generated a limb darkening phenomenon in which the light quantity is increased in the center of the screen while decreased in a peripheral portion, the degree of which depends on the type of the objective lens. Therefore, even if the object has even brightness (intensity of generated fluorescent light), an image having uneven brightness is obtained in the imaging result.

The limb darkening is mainly generated by vignetting and a shift of the conjugate point between a light source and the pinhole, caused by chromatic aberration of magnification. The conjugate point deviation has the following meaning. In fluorescent light observation an excitation wavelength differs from a fluorescent light wavelength. Accordingly, when the peripheral portion of the screen is scanned while the chromatic aberration of magnification exists in the optical system (particularly, in objective lens), the focal position of the fluorescent light is not matched with the pinhole position due to the chromatic aberration of magnification, and the light quantity of the fluorescent light passing through the pinhole is decreased to darken the image of the peripheral portion.

In order to solve the problem of the limb darkening, for example, image processing is performed to increase the light quantity of the peripheral portion in Japanese Patent Application Laid-Open No. 2005-275199 (Patent Document 2). However, an optical correction is desired rather than the image processing.

In view of the foregoing, an object of the invention is to provide a laser scan confocal microscope which can correct the influence of the limb darkening caused by the chromatic aberration of magnification using the optical system even if the objective lens having the chromatic aberration of magnification is used.

SUMMARY

In accordance with a first aspect of the invention, a laser scan confocal microscope includes a light source which is disposed at a position conjugate to a specimen in an illumination optical system to emit illumination light; light separation means for separating the illumination light and observation light, the observation light being emitted from the specimen; light scanning means for scanning the illumination light on the specimen; an objective lens which is disposed between the light scanning means and the sample to form a focal point on the specimen; a collective lens which collects the observation light to a position conjugate to the focal point of the objective lens; a pinhole plate which is provided in a focal plane of the collective lens; detecting means for detecting observation light having passed through a pinhole of the pinhole plate; and two-dimensional light deflection means which is disposed between the light separation means and the pinhole plate, to be driven in synchronization with the light scanning means.

In accordance with a second aspect of the invention, in the laser scan confocal microscope according to first aspect, a telescope optical system is disposed between the light separation means and the two-dimensional light deflection means.

In accordance with a third aspect of the invention, a laser scan confocal microscope includes a light source which is disposed at a position conjugate to a specimen in an illumination optical system to emit illumination light; light separation means for separating the illumination light and observation light, the observation light being emitted from the specimen; light scanning means for scanning the illumination light on the specimen; an objective lens which is disposed between the light scanning means and the sample to form a focal point on the specimen; a collective lens which collects the observation light to a position conjugate to the focal point of the objective lens; a pinhole plate which is provided in a focal plane of the collective lens; detecting means for detecting observation light having passed through a pinhole of the pinhole plate; and two-dimensional light deflection means which is disposed between the light source and the light separation means, to be driven in synchronization with the light scanning means.

In accordance with a fourth aspect of the invention, in the confocal microscope according to the first or third aspect, the light scanning means and the two-dimensional light deflection means are a galvano-mirror type scanner.

In accordance with a fifth aspect of the invention, in the confocal microscope according to the first or third aspect, the two-dimensional light deflection means corrects an optical path deviation between the illumination light and the observation light, the optical path deviation being generated according to a deflection amount of the light scanning means.

In accordance with a sixth aspect of the invention, a laser scan confocal microscope includes a light source which is disposed at a position conjugate to a specimen in an illumination optical system to emit illumination light; light separation means for separating the illumination light and observation light, the observation light being emitted from the specimen; light scanning means for scanning the illumination light on the specimen; an objective lens which is disposed between the light scanning means and the sample to form a focal point on the specimen; a collective lens which collects the observation light to a position conjugate to the focal point of the objective lens; a pinhole plate which is provided in a focal plane of the collective lens; detecting means for detecting observation light having passed through a pinhole of the pinhole plate; and two-dimensional light deflection means for two-dimensionally shifting the pinhole plate, to be driven in synchronization with the light scanning means.

In accordance with a seventh aspect of the invention, in the confocal microscope according to the sixth aspect, the two-dimensionally shifting means corrects an optical path deviation between the illumination light and the observation light, the optical path deviation being generated according to a deflection amount of the light scanning means.

In accordance with an eighth aspect of the invention, a laser scan confocal microscope includes a light source which is disposed at a position conjugate to a specimen in an illumination optical system to emit illumination light; light separation means for separating the illumination light and observation light, the observation light being emitted from the specimen; light scanning means for scanning the illumination light on the specimen; an objective lens which is disposed between the light scanning means and the sample to form a focal point on the specimen; a collective lens which collects the observation light to a position conjugate to the focal point of the objective lens; a pinhole plate which is provided in a focal plane of the collective lens; detecting means for detecting observation light having passed through a pinhole of the pinhole plate; and a plane-parallel plate which is disposed between an illumination lens and the light source, to be driven in synchronization with the light scanning means, the illumination lens being provided between the light source and the light separation means.

In accordance with a ninth aspect of the invention, in the laser scan confocal microscope according to the eighth aspect, two plane-parallel plates are provided while the two plane-parallel plates have rotating axes perpendicular to each other.

In accordance with a tenth aspect of the invention, in the confocal microscope according to the eighth aspect, the plane-parallel plate corrects an optical path deviation between the illumination light and the observation light, the optical path deviation being generated according to a deflection amount of the light scanning means.

In accordance with an eleventh aspect of the invention, the laser scan confocal microscope according to any one of the first, the third, the sixth and the eighth aspects includes storage means in which a relationship between a deflection amount of the light scanning means and a drive amount of one of the two-dimensional light deflection means, the means for two-dimensionally shifting the pinhole plate, the means for two-dimensionally shifting the collective lens, and the plane-parallel plate is stored for each objective lens used.

In accordance with a twelfth aspect of the invention, the laser scan confocal microscope according to any one of the first, the third, the sixth and the eighth aspects includes storage means in which data relating to chromatic aberration of magnification is stored for each objective lens used; and operation means for computing, using the data, a relationship between a deflection amount of the light scanning means and a drive amount of one of the two-dimensional light deflection means, the means for two-dimensionally shifting the pinhole plate, the means for two-dimensionally shifting the collective lens, and the plane-parallel plate.

In accordance with a thirteenth aspect of the invention, the laser scan confocal microscope according to the twelfth aspects includes correction means for correcting the drive amount using scanning information on the light scanning means and intensity information on the observation light.

In accordance with a fourteenth aspect of the invention, confocal microscope includes a light source which is disposed at a position conjugate to a specimen in an illumination optical system to emit illumination light; light separation means for separating the illumination light and observation light, the observation light being emitted from the specimen; light scanning means for scanning the illumination light on the specimen; an objective lens which is disposed between the light scanning means and the sample to form a focal point on the specimen; a collective lens which collects the observation light to a position conjugate to the focal point of the objective lens; a pinhole plate which is provided in a focal plane of the collective lens; detecting means for detecting observation light having passed through a pinhole of the pinhole plate; and correction means for correcting a positional relationship between a focal position of the observation light and the pinhole, to be driven in synchronization with the light scanning means.

Accordingly, the invention can provide the laser scan confocal microscope which can correct the influence of the limb darkening caused by the chromatic aberration of magnification using the optical system even if the objective lens having the chromatic aberration of magnification is used.

DETAILED DESCRIPTION OF EMBODIMENTS

Figure 1:
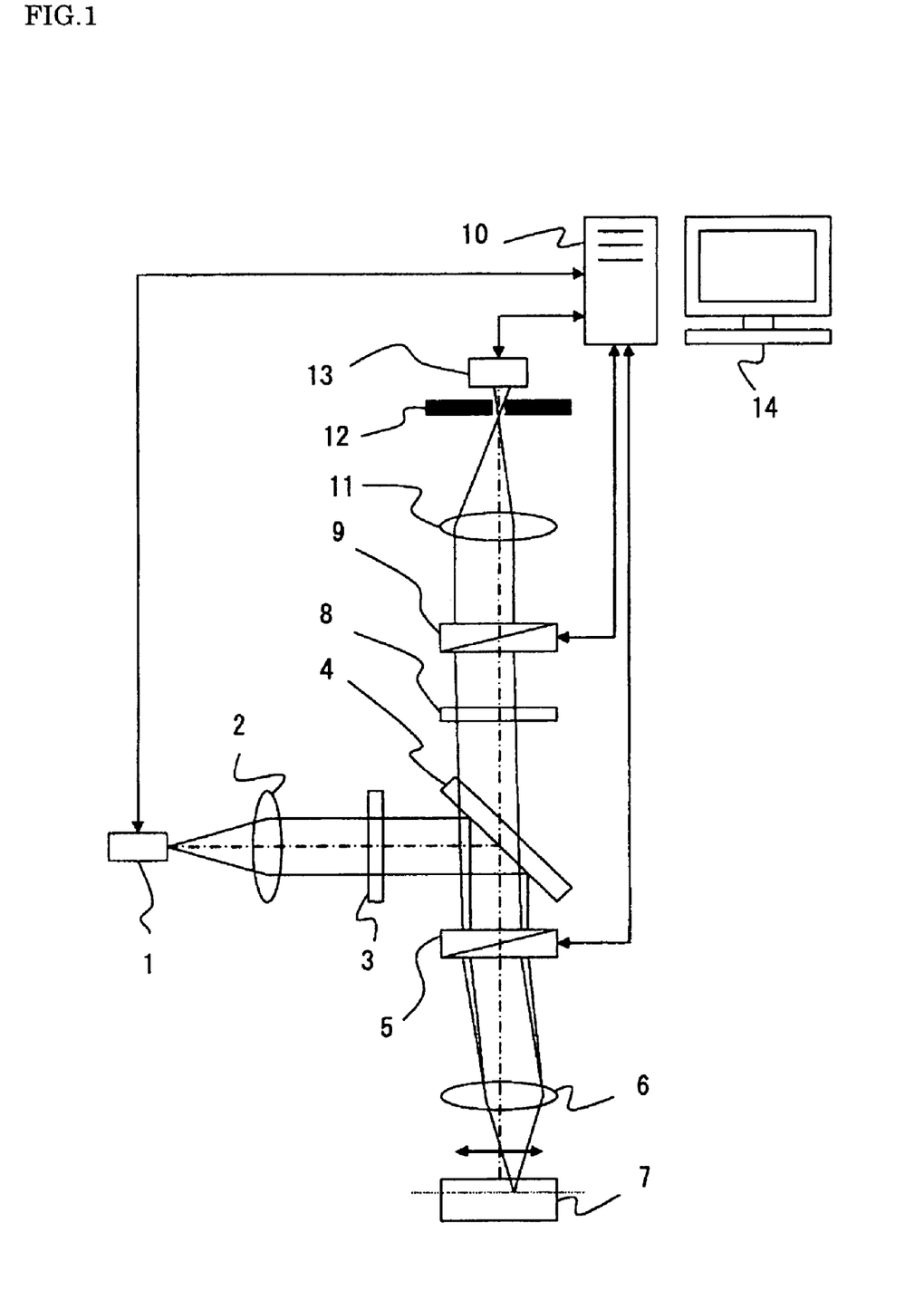
FIG. 1 is a view showing an outline of an optical system in a laser scan confocal microscope according to a first embodiment of the invention.

Embodiments of the invention will be described with reference to the drawings. FIG. 1 is a view showing an outline of an optical system in a laser scan confocal microscope according to a first embodiment of the invention. Illumination light emitted from a light source 1 which is of a point light source is formed into parallel light by an illumination lens 2, only the illumination light having a particular wavelength is selected by and transmitted through a filter 3, and the illumination light is reflected by a dichroic mirror 4 which is of light separation means. Then, the illumination light is changed to two-dimensional scan light by a galvano-scanner 5 which is of scanning means, and the two-dimensional scan light is collected to an inspection surface of a sample 7 by an objective lens 6. The light source 1 and the inspection surface of the sample 7 are conjugate to each other in an illumination optical system from the illumination lens 2 to the objective lens 6. The inspection surface of the sample 7 is matched with a focal plane of the objective lens 6.

Fluorescent light is generated from an irradiation point at which the inspection surface of the sample 7 is irradiated, and the fluorescent light is collected by the objective lens 6. At this point, due to a chromatic aberration of magnification of the objective lens 6, the fluorescent light outgoing from the objective lens 6 travels through an optical path shifted from that of the irradiation light, and the fluorescent light is substantially changed to non-scan light by the galvano-scanner 5. The optical path of the fluorescent light is deviated from the optical path of the irradiation light which is of non-scan light.

The fluorescent light is transmitted through the dichroic mirror 4, lights having unnecessary wavelengths are removed by a filter 8, and the light is incident to deflection means 9 which is of the two-dimensional deflection means. The deflection means 9 is driven in synchronization with the galvano-scanner 5 by a computer 10, and the deflection means 9 corrects an optical path deviation caused by the chromatic aberration of magnification of the objective lens 6. The fluorescent light of which the optical path deviation has been corrected forms an image of an irradiation point of the inspection surface of the sample 7 on a pinhole of a pinhole plate 12 by a collective lens 11.

The irradiation point of the inspection surface of the sample 7 is conjugate to the pinhole of the pinhole plate 12 in an image-formation optical system from the objective lens 6 to the collective lens 11. That is, the pinhole plate 12 is provided at a position which is conjugate to a focal plane of the objective lens 6 for the collective lens 11 at a wavelength of predetermined illumination light. The light having passed through the pinhole is detected by a photodetector 13 and the output is transmitted to the computer 10. The computer 10 forms a two-dimensional image from the output of the photodetector 13 to display the two-dimensional image on a monitor 14. Thus, the image is obtained.

The optical system of the first embodiment is similar to the optical system of the conventional laser scan confocal microscope except that the deflection means 9 is provided. An optical path deviation of the fluorescent light is generated due to the chromatic aberration of magnification of the objective lens 6. Accordingly, unless the deflection means 9 is provided, the image-formation position of the collective lens 11 differs from the pinhole position of the pinhole plate 12 to generate the limb darkening. The chromatic aberration of magnification depends on an angle of view of the objective lens. Accordingly, in the first embodiment, a deflection amount of the deflection means 9 is determined by working of the computer 10 according to a deflection amount of the galvano-scanner, such that wherever the irradiation point is located, the position at which the image of the fluorescent light is formed with the collective lens 11 is matched with the pinhole position of the pinhole plate 12.

The optical path deviation of the fluorescent light caused by the chromatic aberration of magnification is generated depending on the type of the objective lens used, the wavelength of the illumination light (excitation wavelength), and the fluorescent light wavelength (peak wavelength of fluorescent light emitted from fluorescent dye) in addition to a deflection amount of the galvano-scanner 5. Accordingly, the computer 10 performs operations using the type of the objective lens used, the wavelength of the illumination light, the fluorescent light wavelength, and a deflection amount of the galvano-scanner 5 when a deflection amount of the deflection means 9 is determined for the deflection amount of the galvano-scanner 5.

Examples of a parameter used to determine the deflection amount of the deflection means 9 include the type of the objective lens 6, the wavelength of the illumination light (excitation wavelength), the fluorescent light wavelength (peak wavelength of fluorescent light emitted from fluorescent dye), and an angle (hereinafter referred to as deflection angle) formed by the illumination light emitted from the galvano-scanner 5 and the optical axis (the optical axis of the objective lens). The chromatic aberration of magnification is computed from the parameters at each deflection angle of the fluorescent light with respect to the illumination light, and the chromatic aberration of magnification is converted into the deflection amount (rotation angle of deflection means) of the deflection means 9. A pitch of the computed deflection angles can arbitrarily be selected.

After the objective lens, the illumination light wavelength, and the fluorescent light wavelength are determined, deflection amounts of the deflection means 9 are determined for the whole region of the deflection angle before actual images are obtained. The deflection amounts of the deflection means 9 are stored in a memory of the computer 10.

A first method for determining the deflection amounts of the deflection means will be described below.

Figure 6:
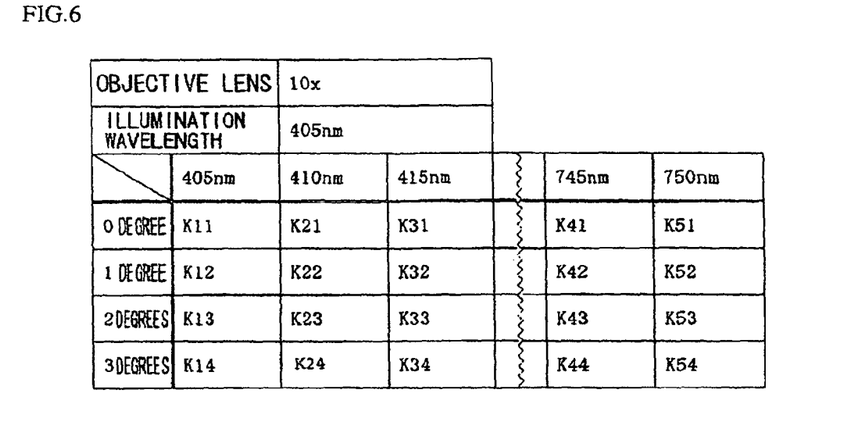
FIG. 6 is a view showing a table used to determine a deflection amount by a first method.

FIG. 6 is a view showing a table used to determine the deflection amounts by the first method. The table of FIG. 6 shows a value of the chromatic aberration of magnification at each deflection angle at each fluorescent light wavelength when the illumination light has the wavelength of 405 nm and the objective lens is of 10×.

K11-K14, K21-K24, K31-K34, K41-K44 and K51-K54 of FIG. 6 designate values of the chromatic aberration of magnification at each fluorescent light wavelength for the illumination light having the wavelength of 405 nm, and K11-K14, K21-K24, K31-K34, K41-K44 and K51-K54 are previously computed from design specifications of the objective lens. Tables of the type shown in FIG. 6, the number of which corresponds to number of the combinations of the objective lenses to be mounted and the wavelengths of the illumination light (excitation wavelengths), are stored in the computer 10. The classification of the objective lens is not limited to the magnification, but preferably the classification is performed in each model of the objective lens.

Using the table of FIG. 6, a deflection amount of the deflection means 9 can be computed at the fluorescent light wavelength of 412 nm and the deflection angle of 2.5 degrees as below. First the chromatic aberration of magnification at the fluorescent light wavelength of 412 nm is computed at the deflection angle of 2.5 degrees. Linear interpolation is performed to a series of data of fluorescent light wavelength of 410 nm and a series of data of fluorescent light wavelength of 415 nm to compute the chromatic aberration of magnification corresponding to the fluorescent light wavelength of 412 nm at each deflection angle. Using the computed values of chromatic aberration of magnification, linear interpolation is performed to chromatic aberration of magnification at the deflection angle of 2 degrees and chromatic aberration of magnification at the deflection angle of 3 degrees to compute the chromatic aberration of magnification at the deflection angle of 2.5 degrees. A deflection amount a of the deflection means 9 is expressed by $$\alpha = \tan^{-1}(K/F) \quad (1)$$

where K designates chromatic aberration of magnification and F designates a focal distance of the objective lens. A deflection direction of the deflection means 9 exists in the same plane as the deflection direction of the galvano-scanner 5, and the deflection direction of the deflection means 9 is such a direction as to cancel the chromatic aberration of magnification.

Figure 7:
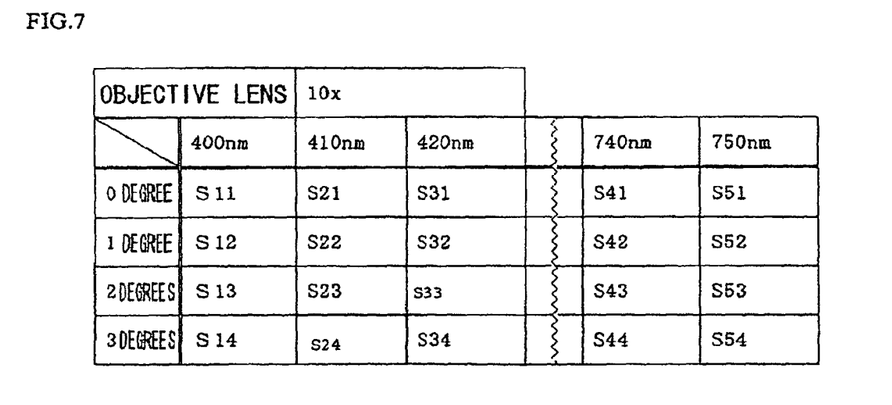
FIG. 7 is a view showing a table used to determine the deflection amount by a modification of the first method.

Additionally, a modification of the first method for determining the deflection amount of the deflection means will be described below. FIG. 7 is a view showing a table used to determine a deflection amount by a modification of the first method. The table of FIG. 7 shows a value of the chromatic aberration of magnification at each deflection angle at each wavelength (illumination light and fluorescent light) in a reference wavelength when the objective lens is of 10×. S11-S14, S21-S24, S31-S34, S41-S44 and S51-S54 of FIG. 7 designate values of the chromatic aberration of magnification at each wavelength in the reference wavelength, and S11-S14, S21-S24, S31-S34, S41-S44 and S51-S54 are previously computed from the design specifications of the objective lens. The reference wavelength can arbitrarily be selected. A d line (587 nm) can be cited as an example. Tables, the number of which corresponds to the number of objective lenses to be mounted, are stored in the computer 10. The classification of the objective lens is not limited to the magnification, but preferably the classification is performed in each model of the objective lens.

Using the table of FIG. 7, a deflection amount of the deflection means 9 can be computed at the illumination light wavelength of 405 nm, the fluorescent light wavelength of 412 nm, and the deflection angle of 2.5 degrees as below. First the chromatic aberration of magnification is computed at each deflection angle at the reference wavelength corresponding to the illumination light wavelength. That is, linear interpolation is performed to a series of data of 400 nm and a series of data of 410 nm to compute the chromatic aberration of magnification at each deflection angle at wavelength of 405 nm in the reference wavelength.

Then, using the computed values of chromatic aberration of magnification, linear interpolation is performed to the chromatic aberration of magnification at the deflection angle of 2 degrees and the chromatic aberration of magnification at the deflection angle of 3 degrees to compute the chromatic aberration of magnification at the deflection angle of 2.5 degrees at the reference wavelength.

The chromatic aberration of magnification is computed at each deflection angle at the reference wavelength corresponding to the fluorescent light wavelength. That is, linear interpolation is performed to the series of data of 410 nm and the series of data of 420 nm to compute the chromatic aberration of magnification at each deflection angle at the reference wavelength of 412 nm.

Then, using the computed values of chromatic aberration of magnification, linear interpolation is performed to the chromatic aberration of magnification at the deflection angle of 2 degrees and the chromatic aberration of magnification at the deflection angle of 3 degrees to compute the chromatic aberration of magnification at the deflection angle of 2.5 degrees at the reference wavelength of 412 nm.

Finally a difference between the chromatic aberration of magnification at the deflection angle of 2.5 degrees at the reference wavelength of 405 nm and the chromatic aberration of magnification at the deflection angle of 2.5 degrees at the reference wavelength of 412 nm is computed to obtain the chromatic aberration of magnification at the illumination light wavelength of 405 nm, the fluorescent light wavelength of 412 nm, and the deflection angle of 2.5 degrees.

Assuming that K designates the chromatic aberration of magnification and F designates the focal distance of the objective lens 6, the deflection amount α of the deflection means 9 is computed from the equation (1). The deflection direction of the deflection means 9 exists in the same plane as the deflection direction of the galvano-scanner 5, and the deflection direction of the deflection means 9 is such a direction as to cancel the chromatic aberration of magnification.

A second method for determining the deflection amount of the deflection means will be described below.

A good approximation of the chromatic aberration of magnification can be computed by the following cubic function $$K = A \times \tan^3(\theta) \quad (2)$$

where K designates the chromatic aberration of magnification and A designates a coefficient determined by a kind of the objective lens and a wavelength.

Figure 8:
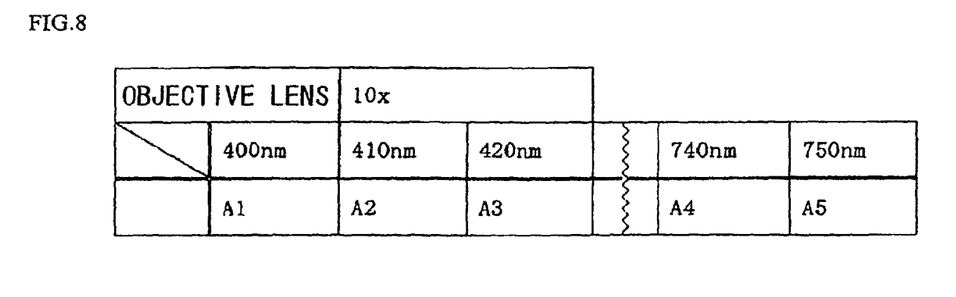
FIG. 8 is a view showing a table used to determine the deflection amount by a second method.

FIG. 8 is a view showing a table used to determine the deflection amount by the second method. The table of FIG. 8 shows coefficient A of the chromatic aberration of magnification at each deflection angle at each wavelength (illumination light, fluorescent light) of the reference wavelength when the objective lens is of 10×. A1 to A5 of FIG. 8 designate values of the coefficient A of the chromatic aberration of magnification at each wavelength of the reference wavelength, and A1 to A5 are previously computed from the design specifications of the objective lens.

The reference wavelength can arbitrarily be selected. The d line (587 nm) can be cited as an example. Tables, the number of which corresponds to the number of objective lenses to be mounted, are stored in the computer 10. The classification of the objective lens is not limited to the magnification, but preferably the classification is performed in each model of the objective lens.

Using the table of FIG. 8, a deflection amount of the deflection means 9 can be computed at the illumination light wavelength of 405 nm, the fluorescent light wavelength of 412 nm, and the deflection angle of 2.5 degrees as below. First, using the equation (2), the chromatic aberration of magnification is computed at each deflection angle at wavelengths of 400 nm and 410 nm of the reference wavelength.

Similarly to the modification of the first embodiment, using the computed values of chromatic aberration of magnification, the chromatic aberration of magnification is computed at the deflection angles of 2.5 degrees at the fluorescent light wavelength of 412 nm with respect to the illumination light wavelength of 405 nm, and the deflection amount α of the deflection means 9 is computed. The method with the table of FIG. 8 has an advantage of reducing the data amount of the table.

A third method for determining the deflection amount of the deflection means will be described below.

In the third method, lens data of the mounted objective lens is stored in the computer 10. The chromatic aberration of magnification of the illumination light with respect to the reference wavelength and the chromatic aberration of magnification of the fluorescent light with respect to the reference wavelength are computed when the illumination light wavelength (excitation wavelength), fluorescent light wavelength and deflection angle of the illumination light are fed into the computer 10. Then the deflection amount of the deflection means 9 is computed in a method like that of the modification of the first method.

The lens data includes a curvature radius of glass constituting the objective lens, surface separation, and a refractive index (dispersion coefficient of glass).

Similarly to the modification of the first method, the deflection amount of the deflection means 9 is determined from the computed chromatic aberration of magnification.

The table and the lens data used in the methods can be added when a new objective lens is added.

The deflection amount determined in the above-described way can be changed before images are obtained. For example, When all the deflection amount are changed to zero, the laser scan confocal microscope is operated in the same manner as the conventional laser scan confocal microscope in which the deflection means 9 is not used.

A correction amount of the chromatic aberration of magnification can finely be corrected by slightly correcting the computed deflection amount. In such cases, the deflection means 9 is driven according to the computed deflection amount to tentatively obtain the image, and a user confirms a degree of the limb darkening from the image displayed on the monitor 14, thereby slightly correcting the deflection amount. Then the image is obtained again to confirm the effect of the correction. The user repeats the manipulation for correcting and obtaining the image according to the results, whereby the deflection amount of the deflection means 9 can be determined such that the limb darkening is minimized. At this point, the user corrects deflection amounts only for several points of the deflection angles. In other deflection angle ranges, deflection amounts are determined by interpolation (linear interpolation or spline interpolation).

With reference to the correction of the deflection amount of the deflection means 9, the computer 10 can automatically and sequentially repeat the correction of the deflection amount and the acquisition of the image such that the degree of the limb darkening is reduced.

Because the galvano-scanner 5 is formed by the galvano-mirror type scanner, the galvano-mirror type scanner is properly used as the deflection means 9, such that the galvano-scanner 5 and the deflection means 9 are easily matched with each other. Alternatively, a resonant-mirror type scanner, a scanner in which a mirror is attached to a piezoelectric element, and an acousto-optic element can appropriately be used.

Figure 2:
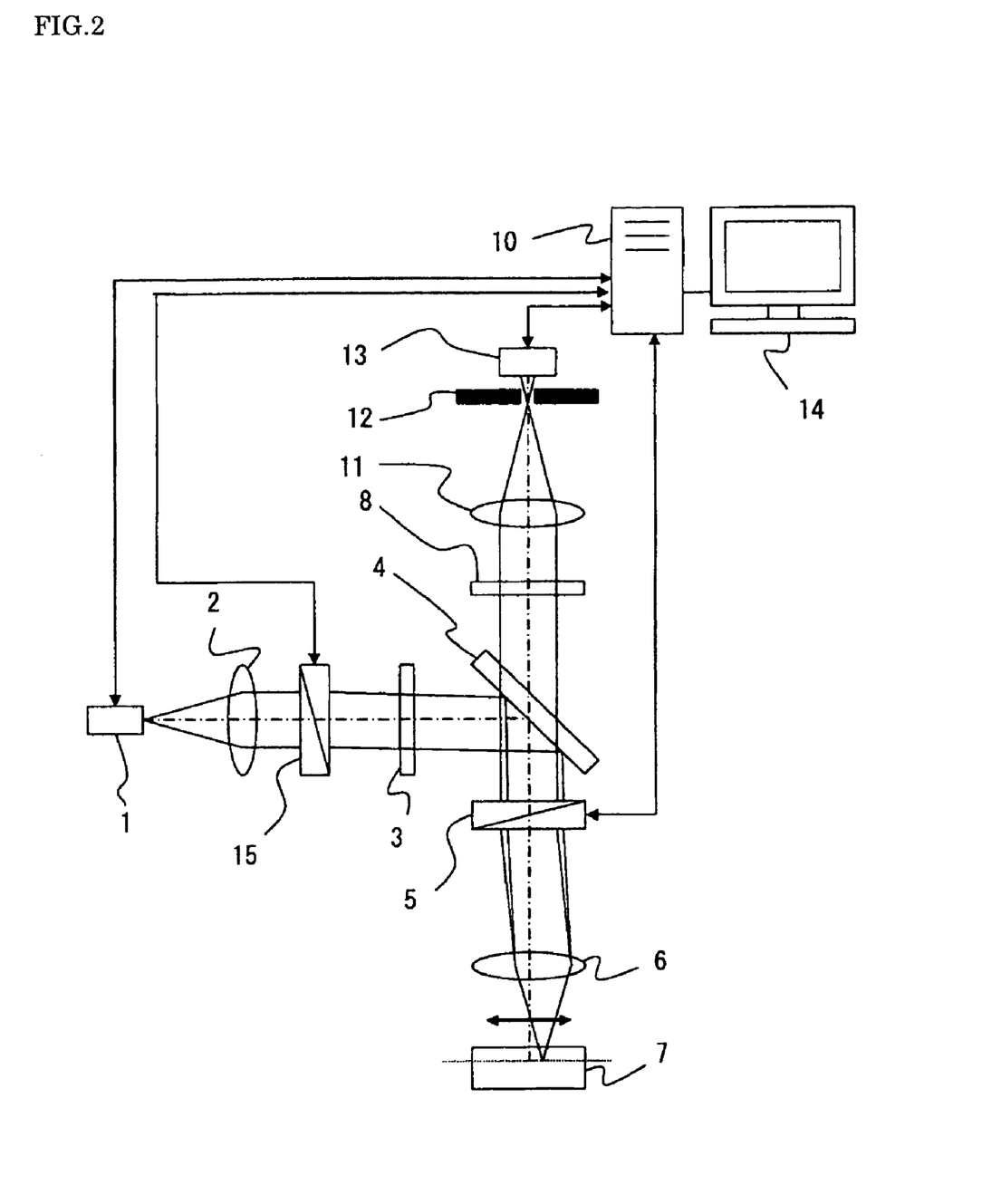
FIG. 2 is a view showing an outline of an optical system in a laser scan confocal microscope according to a second embodiment of the invention.

FIG. 2 is a view showing an outline of an optical system in a laser scan confocal microscope according to a second embodiment of the invention. In the following drawings, the same component as that of the first embodiment is designated by the same numeral, and sometimes the description will be omitted. The second embodiment of FIG. 2 is similar to the first embodiment of FIG. 1 except for the following point. That is, instead of the deflection means 9 which is of the two-dimensional deflection means, deflection means 15 which is of the two-dimensional deflection means is provided between the illumination lens 2 and filter 3 of the illumination optical system. Alternatively, the deflection means 15 may be provided between the filter 3 and the dichroic mirror 4. Similarly to the first embodiment of FIG. 1, the deflection means 15 is driven by the computer 10 in synchronization with the galvano-scanner 5.

In the second embodiment of FIG. 2, the deflection means 15 deflects the optical path of the irradiation light so as to prevent the fluorescent light emitted from the irradiated position of the sample 7 from failing to pass through the pinhole of the pinhole plate 12 due to the chromatic aberration of magnification of the objective lens 6. The second embodiment of FIG. 2 is optically equivalent to the first embodiment of FIG. 1. The deflection amount of the deflection means 15 is determined in the same way as in the first embodiment.

In the second embodiment, because the galvano-scanner 5 is formed by the galvano-mirror type scanner, the galvano-mirror type scanner is properly used as the deflection means 15, such that the galvano-scanner 5 and the deflection means 15 are easily matched with each other. Alternatively, a resonant-mirror type scanner, a scanner in which a mirror is attached to a piezoelectric element, and an acousto-optic element can appropriately be used.

Figure 3:
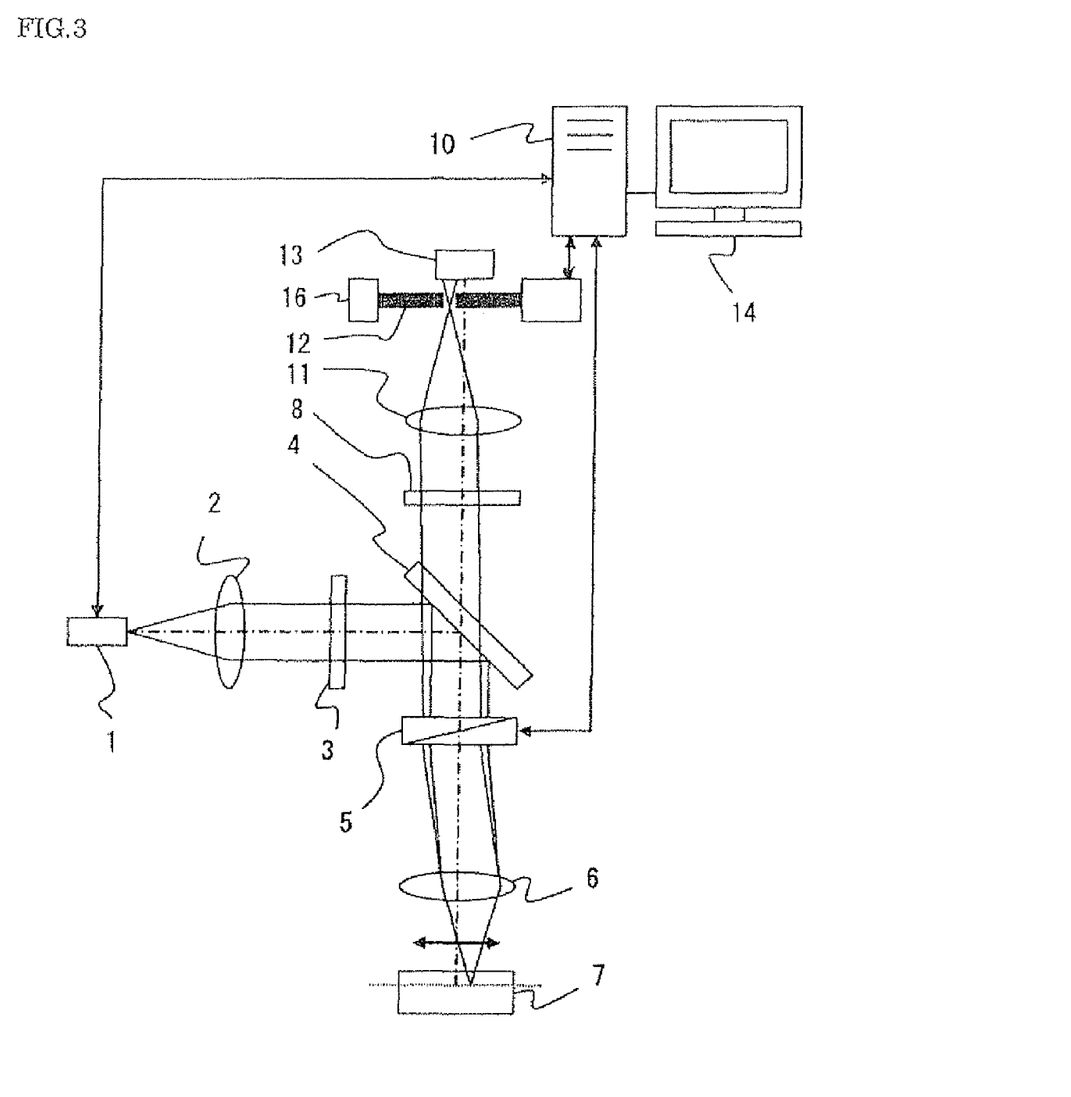
FIG. 3 is a view showing an outline of an optical system in a laser scan confocal microscope according to a third embodiment of the invention.

FIG. 3 is a view showing an outline of an optical system in a laser scan confocal microscope according to a third embodiment of the invention. The third embodiment of FIG. 3 is similar to the first embodiment of FIG. 1 except for the following point. That is, the deflection means 9 which is of the two-dimensional deflection means is eliminated, and a piezoelectric element 16 which two-dimensionally (in directions perpendicular to optical axis) moves the pinhole plate 12 is provided instead of the deflection means 9. The piezoelectric element 16 is driven by the computer 10 in synchronization with the galvano-scanner 5.

In the third embodiment of FIG. 3, the piezoelectric element 16 moves the position of the pinhole so as to prevent the fluorescent light emitted from the irradiated position of the sample 7 from failing to pass through the pinhole of the pinhole plate 12 due to the chromatic aberration of magnification of the objective lens 6.

In determining a drive amount of the piezoelectric element 16, using one of the methods described above in determining the deflection amount of the deflection means, the chromatic aberration of magnification is computed at each deflection angle at the fluorescent light wavelength with respect to the illumination light wavelength.

Assuming that K designates the computed chromatic aberration of magnification, F designates the focal distance of the objective lens 6, and F2 designates a focal distance of the collective lens 11, a moving amount D of the pinhole plate 12 from a reference position (a position conjugate to the focal plane of the objective lens set based on the predetermined illumination light wavelength) is computed by the following equation.

$$D = K \times (F2/F) \tag{3}$$

Although the pinhole plate 12 is two-dimensionally moved in the third embodiment, the same effect can be obtained even if the collective lens 11 is two-dimensionally moved in directions perpendicular to the optical axis.

Figure 4:
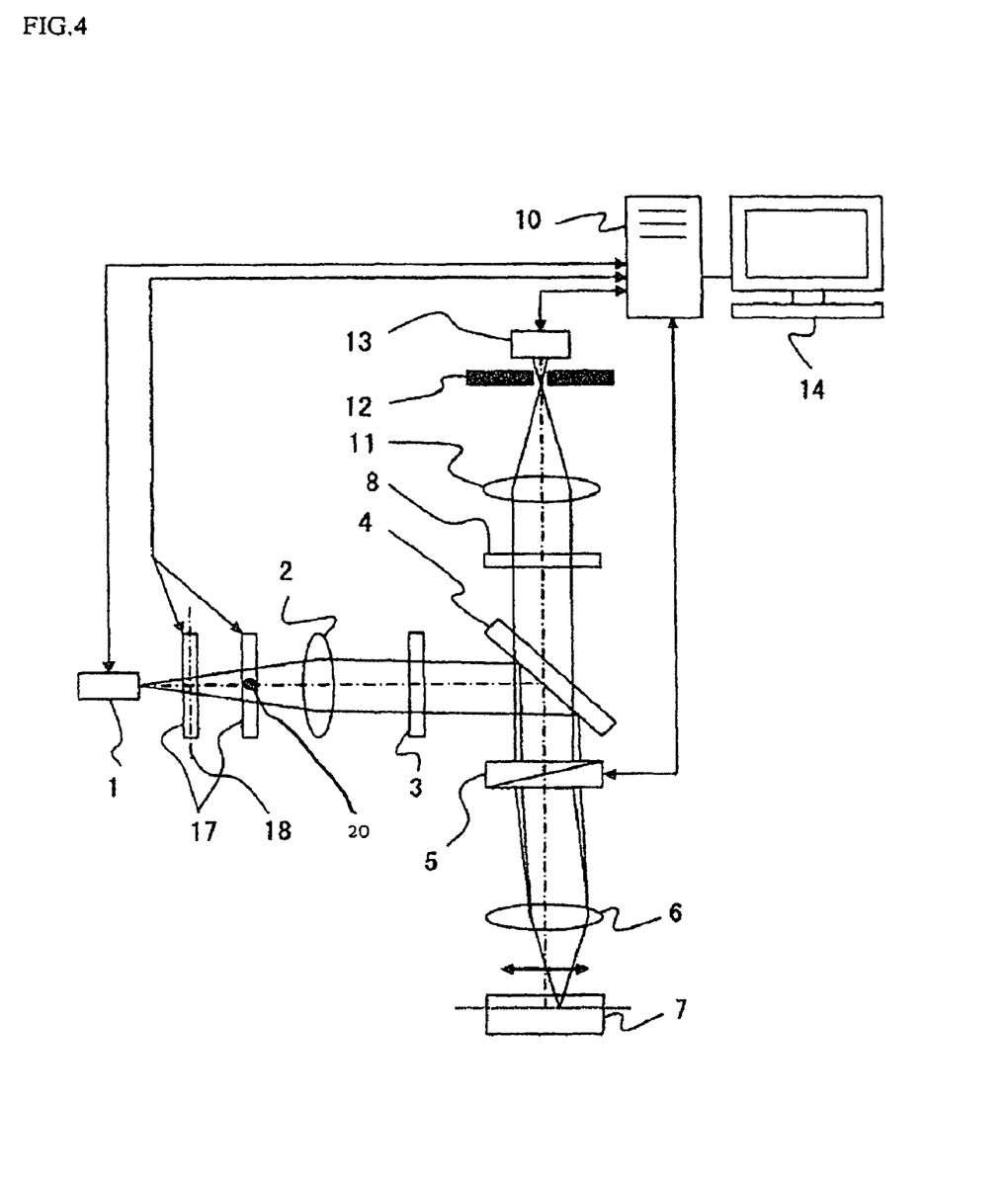
FIG. 4 is a view showing an outline of an optical system in a laser scan confocal microscope according to a fourth embodiment of the invention.

FIG. 4 is a view showing an outline of an optical system in a laser scan confocal microscope according to a fourth embodiment of the invention. The fourth embodiment of FIG. 4 is similar to the first embodiment of FIG. 1 except for the following point. That is, the deflection means 9 which is of the two-dimensional deflection means is eliminated, and two plane-parallel plates 17 are provided between the light source 1 and the illumination lens 2 instead of the deflection means 9. The two plane-parallel plates 17 can be rotated about rotation axes 18, 20. The rotation axes 18, 20 are perpendicular to the optical axis, and the rotation axes 18, 20 are orthogonal to each other. Rotation of the plane-parallel plates 17 is controlled by the computer 10 in synchronization with the movement of the galvano-scanner 5.

When the plane-parallel plates 17 are rotated, the optical path incident to the illumination lens 2 is deviated as if the position of the light source 1 had been relatively moved.

Therefore, the effect equivalent to that of the second embodiment of FIG. 2 can optically be achieved. Because the plane-parallel plates are inserted immediately after the light source, advantageously a loss of the light quantity of the fluorescent light can be reduced compared with the plane-parallel plates inserted on the image-formation optical system side.

In determining rotation angles of the two plane-parallel plates 17, using one of the methods described above in determining the deflection amount of the deflection means, the chromatic aberration of magnification is computed at each deflection angle at the fluorescent light wavelength with respect to the illumination light wavelength.

Assuming that K designates the computed chromatic aberration of magnification, F designates the focal distance of the objective lens 6, and F3 designates a focal distance of the illumination lens 2, a deviation amount L between the optical axis and a center axis of the optical path incident to the illumination lens 2 is computed by the following equation.

$$L = K \times (F3/F) \quad (4)$$

The two plane-parallel plates 17 are rotated such that the deviation amount of the equation (4) is obtained.

In cases where the loss of the light quantity of the fluorescent light does not become troublesome, the two plane-parallel plates are disposed between the collective lens 11 and pinhole plate 12 of the image-formation optical system. The rotation of the plane-parallel plates is controlled by the computer 10 in synchronization with the movement of the galvano-scanner 5 like the fourth embodiment of FIG. 4, which allows the object of the invention to be achieved.

In such cases, because the galvano-scanner 5 is formed by the galvano-mirror type scanner, the galvano-mirror type scanner is properly used as the rotation means, such that the galvano-scanner 5 and the rotation means are easily matched with each other. Alternatively, a resonant type scanner, and a piezoelectric element can appropriately be used.

Figure 5:
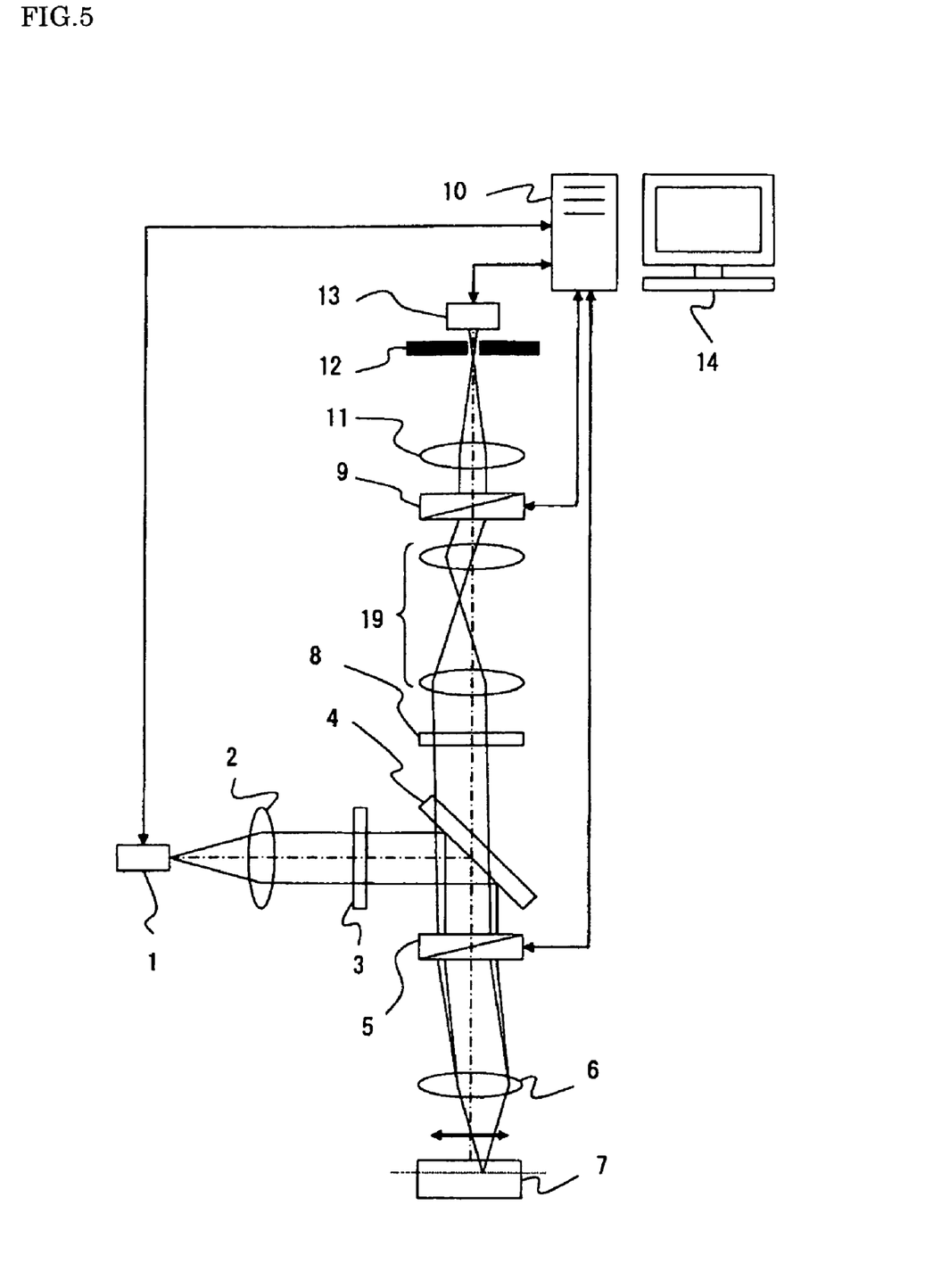
FIG. 5 is a view showing an outline of an optical system in a laser scan confocal microscope according to a fifth embodiment of the invention.

FIG. 5 is a view showing an outline of an optical system in a laser scan confocal microscope according to a fifth embodiment of the invention. The fifth embodiment of FIG. 5 differs from the first embodiment of FIG. 1 in that a telescope system 19 is provided between the dichroic mirror 4 and the deflection means 9, but other optical systems are same.

The deflection amount of the deflection means 9 is extremely small and extremely high accuracy is required to perform the deflection. Therefore, the deviation of the chromatic aberration of magnification is magnified with the telescope, such that the magnified deviation facilitates the correction. Accordingly, in the fifth embodiment, the telescope system 19 (either a Kepler type or a Galileo type) is provided.

In the embodiments mentioned above, a relationship (a relationship for collecting the fluorescent light into the pinhole) between a drive amount of the scanning means and a drive amount of one of the two-dimensional light deflection means, the means for two-dimensionally shifting the pinhole plate, the means for two-dimensionally shifting the collective lens, and the plane-parallel plate is changed when the objective lens is exchanged. Therefore, desirably the relationships are stored in the computer 10 for each objective lens used, and these means are driven by the relationship according to the objective lens actually used.

In the embodiments, the light emitted from the light source is reflected and folded by the dichroic mirror 4, the light is incident to the sample, and the generated fluorescent light is transmitted through the dichroic mirror 4. Alternatively, the light emitted from the light source may be transmitted through the dichroic mirror 4, and the fluorescent light may be reflected and folded by the dichroic mirror 4. A dichroic prism may be used instead of the dichroic mirror 4.

The filter 3 needs not to be used when the light source 1 is monochrome. The filter 8 may be located at any position between the dichroic mirror 4 and the photodetector 13. As the wavelength of the light source is shortened like the UV region and the wavelength of 405 nm, the chromatic aberration of magnification of the objective lens is increased, and therefore the embodiments of the invention are effectively applied.

Desirably a pupil relay lens and an image-formation lens are disposed between the objective lens 6 and the galvano-scanner 5. In such cases, an image of the illumination light two-dimensionally scanned by the galvano-scanner 5 is tentatively formed by the pupil relay lens, and the illumination light is incident to the image-formation lens to return to parallel light. Then the illumination light is incident to the objective lens 6 and collected onto the inspection surface of the sample 7. The objective lens 6 is changeable.

What is claimed is:

1. A confocal microscope comprising:
    a light scanner that scans illumination light emitted by a light source on a specimen;
    an objective lens which is disposed between the light scanner and the specimen to form a focal point on the specimen;
    a collective lens which collects observation light to a position conjugate to the focal point of the objective lens;
    a pinhole plate which is provided in a focal plane of the collective lens;
    a two-dimensional shifting device that two-dimensionally shifts the pinhole plate, to be driven in synchronization with the light scanner; and
    a memory in which a relationship between a deflection amount of the light scanner and a drive amount of the two-dimensional shifting device for two-dimensionally shifting the pinhole plate is stored, the drive amount being calculated based on chromatic aberration of magnification of the objective lens relating to the deflection amount of the light scanner.

2. The confocal microscope according to claim 1, wherein the two-dimensional shifting device corrects an optical path deviation between the illumination light and the observation light, the optical path deviation being generated according to the deflection amount of the light scanner.

3. The confocal microscope according to claim 1, wherein the objective lens is one of a plurality of objective lenses included in the microscope and in the memory a relationship between the deflection amount of the light scanner calculated using data relating to chromatic aberration of magnification of each of the plurality of objective lenses and the drive amount of the two-dimensional shifting device for two-dimensionally shifting the pinhole plate is stored.

4. A confocal microscope comprising:
    a light scanner that scans illumination light emitted by a light source on a specimen;
    an objective lens which is disposed between the light scanner and the specimen to form a focal point on the specimen;
    a collective lens which collects observation light to a position conjugate to the focal point of the objective lens;
    a pinhole plate which is provided in a focal plane of the collective lens;
    a two-dimensional shifting device that two-dimensionally shifts the pinhole plate, to be driven in synchronization with the light scanner; and a memory in which data relating to chromatic aberration of magnification of the objective lens is stored and a computer for computing, using the data, a relationship between a deflection amount of the light scanner and a drive amount of the two-dimensional shifting device for two-dimensionally shifting the pinhole plate.

5. The confocal microscope according to claim 4, wherein the objective lens is one of a plurality of objective lenses included in the microscope and in the memory data relating to chromatic aberration of magnification is stored for each of the plurality of objective lenses.

6. The confocal microscope according to claim 4, wherein the computer corrects the drive amount using scanning information on the light scanner and intensity information on the observation light.

7. The confocal microscope according to claim 4, wherein the two-dimensional shifting device corrects an optical path deviation between the illumination light and the observation light, the optical path deviation being generated according to a deflection amount of the light scanner.

8. A confocal microscope comprising:
a light scanner that scans illumination light emitted by a light source on a specimen;
an objective lens which is disposed between the light scanner and the specimen to form a focal point on the specimen;
a collective lens which collects observation light to a position conjugate to the focal point of the objective lens;
a pinhole plate which is provided in a focal plane of the collective lens;
a two-dimensional shifting device that two-dimensionally shifts the pinhole plate, to be driven in synchronization with the light scanner; and
a controller that controls the two-dimensional shifting device based on a drive amount of the two-dimensional shifting device, the drive amount being calculated based on chromatic aberration of magnification of the objective lens relating to a deflection amount of the light scanner.

9. A confocal microscope comprising:
a light scanning means that scans illumination light emitted by a light source on a specimen;
an objective lens which is disposed between the light scanning means and the specimen to form a focal point on the specimen;
a collective lens which collects observation light to a position conjugate to the focal point of the objective lens;
a pinhole plate which is provided in a focal plane of the collective lens;
a two-dimensional shifting device that two-dimensionally shifts the pinhole plate, to be driven in synchronization with the light scanning means; and
a controller that calculates a drive amount of the two-dimensional shifting device based on chromatic aberration of magnification of the objective lens relating to a deflection amount of the light scanning means, the controller controlling the two-dimensional shifting device based on the calculated drive amount.

* * * * *

UNITED STATES PATENT AND TRADEMARK OFFICE
CERTIFICATE OF CORRECTION

PATENT NO. : 8,400,709 B2  
APPLICATION NO. : 12/929506  
DATED : March 19, 2013  
INVENTOR(S) : Yuki Yoshida et al.

It is certified that error appears in the above-identified patent and that said Letters Patent is hereby corrected as shown below:

On the Title Page

Item (73) should read

Assignee: ~~Nikon, Corporation~~ Nikon Corporation

Signed and Sealed this  
Sixteenth Day of July, 2013

Teresa Stanek Rea  
*Acting Director of the United States Patent and Trademark Office*